US008329825B2

(12) United States Patent
Mori et al.

(10) Patent No.: US 8,329,825 B2
(45) Date of Patent: Dec. 11, 2012

(54) MATERIAL FOR VIBRATION CONTROL, ARTICLE FOR VIBRATION CONTROL AND MULTILAYER LAMINATE FOR VIBRATION CONTROL

(75) Inventors: Ryoji Mori, Ichihara (JP); Masahiko Okamoto, Chiba (JP); Takashi Nakagawa, Ichihara (JP); Shigenobu Ikenaga, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 512 days.

(21) Appl. No.: 12/086,189

(22) PCT Filed: Nov. 14, 2006

(86) PCT No.: PCT/JP2006/322675
§ 371 (c)(1), (2), (4) Date: Nov. 18, 2008

(87) PCT Pub. No.: WO2007/066475
PCT Pub. Date: Jun. 14, 2007

(65) Prior Publication Data
US 2009/0162633 A1 Jun. 25, 2009

(30) Foreign Application Priority Data

Dec. 9, 2005 (JP) ................................. 2005-356633
Mar. 23, 2006 (JP) ................................. 2006-080436
Sep. 8, 2006 (JP) ................................. 2006-244762

(51) Int. Cl.
C08L 23/12 (2006.01)
C08L 23/18 (2006.01)
C08L 23/04 (2006.01)

(52) U.S. Cl. ...................... 525/240; 526/348.5; 526/348

(58) Field of Classification Search ............... 526/348.6, 526/348, 348.5; 525/240, 191
See application file for complete search history.

(56) References Cited

U.S. PATENT DOCUMENTS

| | | | | |
|---|---|---|---|---|
| 3,923,758 A * | 12/1975 | Carter et al. | ................... | 526/152 |
| 4,832,775 A * | 5/1989 | Park et al. | ................... | 156/272.6 |
| 5,646,194 A * | 7/1997 | Kobayashi et al. | ............... | 521/79 |
| 6,632,885 B2 * | 10/2003 | Morizono et al. | ............ | 525/191 |
| 6,635,715 B1 * | 10/2003 | Datta et al. | ..................... | 525/240 |
| 7,250,211 B1 * | 7/2007 | Minami et al. | .......... | 428/355 EN |
| 7,488,777 B2 * | 2/2009 | Inoue | ............................. | 525/191 |
| 7,488,789 B2 * | 2/2009 | Ikenaga et al. | ............. | 526/348.6 |
| 7,847,040 B2 * | 12/2010 | Mori et al. | .................... | 526/170 |
| 2004/0158000 A1 * | 8/2004 | Yada et al. | .................... | 525/240 |
| 2005/0106978 A1 | 5/2005 | Cheng et al. | | |
| 2006/0247381 A1 * | 11/2006 | Mori et al. | .................... | 525/240 |
| 2006/0276607 A1 * | 12/2006 | Ikenaga et al. | ............. | 526/348.6 |
| 2007/0225431 A1 * | 9/2007 | Mori et al. | .................... | 524/584 |
| 2007/0251572 A1 * | 11/2007 | Hoya et al. | .................... | 136/256 |

FOREIGN PATENT DOCUMENTS

| | | |
|---|---|---|
| EP | 1 630 196 A1 * | 3/2006 |
| EP | 1 741 747 A1 | 1/2007 |
| JP | 60-243144 A * | 12/1985 |
| JP | 05-239287 | 9/1993 |
| JP | 06-287253 | 10/1994 |
| JP | 07-216123 | 8/1995 |
| JP | 08-231783 | 9/1996 |
| JP | 10-139943 | 5/1998 |
| JP | 2002-317081 | 10/2002 |
| JP | 2003-105145 | 4/2003 |
| WO | WO 00-01766 | 1/2000 |
| WO | WO 01/30891 A1 * | 5/2001 |
| WO | WO 02/060965 A2 | 8/2002 |
| WO | WO 2005/103141 A1 * | 11/2003 |
| WO | WO 2004/087775 A1 * | 10/2004 |
| WO | WO 2004/106430 A1 * | 12/2004 |
| WO | WO 2005/103141 | 11/2005 |
| WO | WO 2006/057361 A1 * | 6/2006 |

OTHER PUBLICATIONS

Extended European Search Report Communication issued by the European Patent Office on Feb. 4, 2010 in European Application No. 06832631.3-2109 (5 pages).

* cited by examiner

*Primary Examiner* — Rip A. Lee
(74) *Attorney, Agent, or Firm* — Foley & Lardner LLP

(57) ABSTRACT

A material for vibration control of the invention includes a propylene polymer (A) containing a constitutional unit (a) derived from propylene in the proportion of 40 to 100 mol % and a constitutional unit (b) derived from α-olefin having 2 to 20 carbon atoms excluding propylene in the proportion of 60 to 0 mol % [provided that the total of (a) and (b) is 100 mol %], and having a melting point measured by DSC of 90° C. or below or no observed melting point, and the material has excellent vibration controllability such as vibration damping property, vibration preventing property, sound insulating property, and sound absorbing property.

13 Claims, No Drawings

MATERIAL FOR VIBRATION CONTROL, ARTICLE FOR VIBRATION CONTROL AND MULTILAYER LAMINATE FOR VIBRATION CONTROL

TECHNICAL FIELD

The present invention relates to a material for vibration control, more specifically relates to a material for vibration control containing a specific propylene polymer.

BACKGROUND ART

From the past, in order to prevent vibration of structural members such as a ship, a vehicle, an automobile component, a household electrical appliance, various machines, building materials, an acoustic equipment, and the like, and so as to prevent unnecessary noise involved, there has been carried out a coating or attaching of materials having the property of damping or preventing vibration, on the surface or inner side of the structural members. In addition, it is general to use the material having the property of damping or preventing vibration in an acoustic diaphragm, for increasing the elastic modulus and damages inside. As the material having the property of damping or preventing vibration, there has been used a rubber, asphalt, various synthetic resin emulsion and latex, or a synthetic resin, etc., or further a material prepared by to which powder such as graphite, mica, carbon black, vermiculite, calcium carbonate, talc, clay, etc., or natural or synthetic fiber is blended.

However, although many of the above known materials for damping or preventing vibration possess the property of damping or preventing vibration at around ordinary temperature, they have problems in that the temperature range of exhibiting the property of damping or preventing vibration is extremely narrow, the mechanical strength at high temperature is a lot lowered as its thermal resistance is deteriorated, and the range of use is limited as its weather resistance is deteriorated.

For the techniques to solve the problems in conventional materials for damping or preventing vibration, and materials for preventing or absorbing sound, Japanese Unexamined Patent Application Publication No. 5-239287 (Patent Document 1) discloses a vibration damping/preventing composition comprising amorphous polyolefin, asphalt and an inorganic filler. However, the composition has problems in that the rubber elasticity and thermal resistance are not sufficient, and vibration controlling ability is also not sufficient.

In addition, Japanese Unexamined Patent Application Publication No. 6-287253 (Patent Document 2) discloses a resin for vibration-damping materials comprising a block copolymer of styrene or the like and an acrylic acid ester or the like. However, there are problems that the composition is high in cost and low in hygiene.

Patent Document 1: Japanese Unexamined Patent Application Publication No. 5-239287
Patent Document 2: Japanese Unexamined Patent Application Publication No. 6-287253

DISCLOSURE OF THE PRESENT INVENTION

Problems to be Solved by this Invention

The present invention is made to solve the above mentioned problems and is aimed to provide a material for vibration control having an excellent vibration controlling property.

In addition, the present invention is made to solve the above mentioned problems and is aimed to provide an article for vibration control having an excellent vibration controlling property.

The present invention is made to solve the above mentioned problems and is aimed to further provide a multilayer laminate for vibration control having an excellent vibration controlling property.

Means for Solving the Problems

The material for vibration control comprises a propylene polymer (A) having 40 to 100 mol % of a constitutional unit (a) derived from propylene and 60 to 0 mol % (the total of (a) and (b) is 100 mol %) of a constitutional unit (b) derived from α-olefin having 2 to 20 carbon atoms excluding propylene, and has a melting point measured by DSC of 90° C. or below or has no observed melting point; or a composition comprising the propylene polymer (A).

The material for vibration control can be exemplified by materials which are applicable for at least one use selected from the group consisting of use for preventing vibration, use for insulating sound, use for damping vibration, and use for absorbing sound.

The composition preferably further comprises a propylene polymer (B) which has a melting point measured by DSC of 100° C. or above.

The composition is preferably a composition comprising 100 to 40 parts by weight of the propylene polymer (A) and 0 to 60 parts by weight (the total of the propylene polymer (A) and the propylene polymer (B) is 100 parts by weight) of the propylene polymer (B), and more preferably a composition comprising 99 to 40 parts by weight of the propylene polymer (A) and 1 to 60 parts by weight of the propylene polymer (B).

The propylene polymer (A) is preferably a propylene/α-olefin having 4 to 20 carbon atoms copolymer and has 1 to 35 mol % of a constitutional unit derived from α-olefin having 4 to 20 carbon atoms, and is also preferably a propylene/ethylene/α-olefin having 4 to 20 carbon atoms copolymer and has 1 to 25 mol % of a constitutional unit derived from ethylene and 1 to 35 mol % of a constitutional unit derived from α-olefin having 4 to 20 carbon atoms.

The propylene polymer (A) is preferably a propylene polymer, for which an absorption intensity A observed at 22.0 to 20.9 ppm, an absorption intensity B observed at 19.0 to 20.6 ppm, and an absorption intensity C observed at 19.0 to 22.0 ppm assigned to propylene methyl, in the signal chart where a peak at the highest magnetic field among the signals originating from CH (methine) constitutional units derived from α-olefin having 4 to 20 carbon atoms measured by $^{13}$C-NMR in an o-dichlorobenzene solvent is defined as 34.4 ppm, are satisfying the following relational expressions (i) and (ii):

$$(A/C) \times 100 \leq 8 \qquad (i),$$

and $$(B/C) \times 100 \geq 60 \qquad (ii).$$

The propylene polymer (A) is preferably obtained by polymerizing monomers containing propylene in the presence of a catalyst including a transition metal compound represented by the following general formula (1):

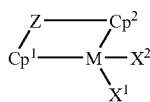 (1)

wherein, M is Ti, Zr, Hf, Nd, Sm, or Ru, $Cp^1$ and $Cp^2$ are each pi-bonded with M and are each a cyclopentadienyl group, an indenyl group, a fluorenyl group, or derivatives thereof, $Cp^1$ and $Cp^2$ are each a group different from each other, $X^1$ and $X^2$ are each an anionic ligand or a neutral Lewis base ligand, and Z is an atom selected from C, O, B, S, Ge, Si and Sn, or a group containing the atom.

The composition may further comprise 1 to 500 parts by weight of an ethylene/α-olefin copolymer (C), and also may further comprise 1 to 500 parts by weight of an ethylene/polar monomer copolymer (D), to 100 parts by weight in total of the propylene polymer (A) and the propylene polymer (B).

The composition may further comprise 1 to 1,000 parts by weight of an inorganic filler (Z), also may further comprise 0.0001 to 10 parts by weight of the foaming agent (F), and also may further comprise 0.001 to 10 parts by weight of a crosslinking agent (G), to 100 parts by weight in total of the propylene polymer (A), the propylene polymer (B), the ethylene/α-olefin copolymer (C), and the ethylene/polar monomer copolymer (D).

The article for vibration control of the invention is obtained from the material for vibration control of the invention. The article may be a foam product, and at least one part thereof may be crosslinked.

The article for vibration control of the invention comprises the material for vibration control of the invention. The article may be a foam product.

The multilayer laminate for vibration control of the invention has at least one layer which comprises the article for vibration control of the invention.

The multilayer laminate for vibration control may have at least one substrate and at least one layer which comprises the article for vibration control.

EFFECT OF THE INVENTION

The material for vibration control according to the invention comprises a specific propylene polymer (A) which has a melting point of 90° C. or below or has no observed melting point when measured with DSC, or a composition containing the propylene polymer (A). Accordingly, an article obtained from the material, an article comprises the material, and a multilayered laminate having a layer which comprises the article have excellent vibration controllability such as vibration-damping property, vibration-preventing property, sound-insulating property, and sound-absorbing property.

When the material for vibration control according to the invention comprises a composition containing a specific propylene polymer (B) which has a melting point of 100° C. or above when measured with DSC, an article obtained from the material, an article comprising the material, and a multilayered laminate having a layer which comprises the article are also particularly excellent in the balance of vibration controllability (such as vibration-damping property, vibration-preventing property, sound-insulating property, and sound-absorbing property) and thermal resistance.

When the material for vibration control according to the invention further contains an ethylene/α-olefin copolymer (C) and/or ethylene/polar monomer copolymer (D), an article obtained from the material, an article comprising the material, and a multilayered laminate having a layer which comprises the article are particularly excellent in the balance of vibration-damping property, vibration-preventing property, sound-insulating property, and sound-absorbing property, and the impact strength at low temperature.

When the article is obtained by foaming the material for vibration control according to the invention, the article for vibration control according to the invention and a multilayered laminate of the invention having a layer which comprises the article are further excellent in the vibration controllability and in the balance of vibration controllability and lightweight property.

When the article is obtained by crosslinking the material for vibration control according to the invention, the article for vibration control according to the invention and the multilayered laminate of the invention having a layer which comprises the article are further excellent particularly in the balance of vibration controllability and rubber elasticity.

When at least one part of the material for vibration control according to the invention is graft modified with at least one selected from a silane compound, a titanium compound, and a polar group-containing vinyl monomer, the material for vibration control provides the article for vibration control which is particularly excellent in vibration controllability, and further excellent in adhesivity with other layers.

BEST MODE FOR CARRYING OUT THE INVENTION

Hereinafter, the material for vibration control, the article for vibration control, and the multilayer laminate for vibration control according to the invention will be described in further detail.

Examples of the material for vibration control of the invention include a vibration-damping material, a vibration-preventing material, a sound-insulating material, and a sound-absorbing material. When the material is for example the "vibration-damping material", without limiting the use of the material to vibration damping, the material can be applied for at least one use selected from for preventing vibration, for insulating sound, and for absorbing sound, in addition to the use for damping the vibration. In the same manner, for the "vibration-preventing material", "sound-insulating material", and "sound-absorbing material", without limiting the use of the materials to the vibration prevention, sound insulation, and sound absorption, respectively, the materials can be applied for at least one another use selected from for damping vibration, for preventing vibration, for insulating sound, and for absorbing sound. Here, "for damping the vibration" for example includes use for preventing transmission of vibration and impact, for damping the vibration (that is, for absorbing the vibration), and for relieving the impact.

Material for Vibration Control

The material for vibration control of the invention comprises a propylene polymer (A) or a composition comprising the propylene polymer (A). That is, the material for vibration control of the invention contains the propylene polymer (A) as an essential component and may be a composition further containing at least one selected from the group consisting of propylene polymer (B), an ethylene/α-olefin copolymer (C), an ethylene/polar monomer copolymer (D), a flame retardant (E), a foaming agent (F), a crosslinking agent (G), tackifier (H), and an inorganic filler (Z) as an optional component.

<Propylene Polymer (A)>

The propylene polymer (A) used in the invention contains a constitutional unit (a) derived from propylene in the proportion of 40 to 100 mol % and a constitutional unit (b) derived from α-olefin having 2 to 20 carbon atoms excluding propylene in the proportion of 60 to 0 mol %, and preferably contains the constitutional unit (a) in the proportion of 55 to 90 mol % and the constitutional unit (b) in the proportion of 45 to 10 mol %.

In addition, the melting point of the propylene polymer (A) useful for the invention is 90° C. or below or not observed when measured with DSC (Differential Scanning Calorimetry). Thus, the material for vibration control of the invention has excellent vibration damping property, vibration preventing property, sound insulating property, and sound absorbing property.

Here, the melting point measured with DSC refers to a temperature at the maximum melting peak position, which is obtained from an exotherm/endotherm curve of DSC when temperature is elevated, more specifically is a temperature at the maximum melting peak position obtained from an exotherm/endotherm curve when a sample is placed in an aluminum pan and heated to 200° C. at a rate of 100° C./min, kept at 200° C. for 5 minutes, cooled down to −150° C. at 10° C./min, and then subsequently heated at a rate of 10° C./min. The "melting point is not observed" means that there is no observed melting peak for which the heat of fusion of crystalline is 1 J/g or more within the range of −150 to 200° C.

For the DSC measurement of the propylene polymer (A), preferably the melting peak (a melting peak for which the heat of fusion is 1 J/g or more. Same below) is not observed, and further preferably the crystallization peak for which the heat of crystallization is 1 J/g or more is not observed.

Tg of the propylene polymer (A) measured with DSC is preferably −10° C. or below.

The preferred embodiment of the propylene polymer (A) can be exemplified by a propylene homopolymer with which no melting peak is observed when measured with DSC, a propylene/α-olefin (except propylene) having 2 to 20 carbon atoms copolymer with which no melting peak is observed when measured with DSC, and polymers having an atactic structure. These can be produced according to methods disclosed in [0012] to [0039] of Japanese Unexamined Patent Application Publication No. 2000-52510.

More preferred embodiment of the propylene polymer (A) useful for the invention can be exemplified by a propylene polymer (hereinafter also may be referred to as "propylene polymer (A1)") which is a propylene/α-olefin having 4 to 20 carbon atoms copolymer and contains a constitutional unit derived from α-olefin having 4 to 20 carbon atoms of 1 to 40 mol %, and more preferably 1 to 35 mol % (the total constitutional unit contained in the propylene polymer (A) is 100 mol %).

The propylene polymer (A) used in the invention is preferably the propylene polymer (A1) from the viewpoint of exhibiting excellent properties for damping and preventing vibration and high rupture strength.

Specific examples of the preferred propylene polymer (A1) include a propylene homopolymer with which no melting peak is observed when measured with DSC, and a propylene/α-olefin copolymer with which no melting peak is observed when measured with DSC.

More preferred embodiment of the propylene polymer (A) used in the invention can be exemplified by a propylene polymer (hereinafter, also may be referred to as "propylene polymer (A2)") which is a propylene/ethylene/α-olefin having 4 to 20 carbon atoms copolymer and contains a constitutional unit derived from ethylene of 1 to 25 mol %, preferably 1 to 20 mol %, more preferably 5 to 11 mol %, and a constitutional unit derived from α-olefin having 4 to 20 carbon atoms of 1 to 35 mol %, preferably 15 to 35 mol %, and more preferably 25 to 30 mol % (the total constitutional unit contained in the propylene polymer (A) is 100 mol %).

The propylene polymer (A) used in the invention is preferably the propylene polymer (A2) from the viewpoint of giving a good balance of flexibility, abrasion resistance, and properties for damping and preventing vibration.

The propylene polymer (A2) tends to give particularly a good balance of flexibility and low temperature property when compared with a copolymer constituted by propylene and α-olefin having 4 to 20 carbon atoms only, and tends to give a good balance of properties for damping and preventing vibration, strength, and abrasion resistance when compared with a copolymer constituted by propylene and ethylene.

The α-olefin having 4 to 20 carbon atoms is not particularly limited, but is preferably α-olefin having 4 to 12 carbon atoms and may have a straight-chain or branched-chain.

Examples of the α-olefin having 4 to 20 carbon atoms include 1-butene, 2-butene, 1-pentene, 1-hexene, 1-heptane, 1-octene, 1-nonene, 1-decene, 1-undecene, 1-dodecen, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, and the like, preferably 1-butene, 1-hexene, 1-octene, 1-decene, and 4-methyl-1-pentene, more preferably 1-butene, 1-hexene, 1-octene, and 1-decene, and particularly preferably 1-butene. The α-olefins can be used alone or in combination of two or more kinds.

The propylene polymer (A) preferably contains only a constitutional unit (a) derived from propylene, or contains only the constitutional unit (a) and a constitutional unit (b) derived from α-olefin having 2 to 20 carbon atoms (except propylene), from the viewpoint of resistance to weather, flexibility, and vibration control property (such as vibration-damping property, vibration-preventing property, sound-insulating property, and sound-absorbing property).

On the other hand, from the viewpoint of crosslinking and vulcanization, there may contain a constitutional unit derived from an aromatic vinyl compound such as styrene, a constitutional unit derived from the unsaturated polyene compound (polyene) having two or more double bonds, a constitutional unit derived from alcohol, carboxylic acid, amine, and derivatives thereof, and the like, in addition to the constitutional unit (a) and constitutional unit (b). When such is the case, the content of the constitutional units other than the constitutional unit (a) and constitutional unit (b) is, for example, 0.01 to 10 mol % and preferably 0.03 to 5 mol %, with respect to total 100 mol % of (a) and (b).

Particularly preferred embodiment of the propylene polymer (A) used in the invention can be exemplified by a propylene polymer (hereinafter, also may be referred to as "propylene polymer (A3)"), for which an absorption intensity A observed at 22.0 to 20.9 ppm, an absorption intensity B observed at 19.0 to 20.6 ppm, and an absorption intensity C observed at 19.0 to 22.0 ppm, in the signal chart where a peak at the highest magnetic field among the signals originating from CH (methine) constitutional units derived from α-olefin having 4 to 20 carbon atoms measured by $^{13}$C-NMR in an o-dichlorobenzene solvent is defined as 34.4 ppm, are satisfying the following relational expressions:

$(A/C) \times 100 \leq 8$ (i), and $(B/C) \times 100 \geq 60$ (ii).

The propylene polymer (A3) tends to be excellent in transparency, flexibility, and abrasion resistance.

Here, the "absorption intensity A observed at 22.0 to 20.9 ppm" refers to the sum of area for peaks present in the region between 22.0 to 20.9 ppm, and same applies to the absorption intensity B and absorption intensity C.

The absorption intensities A, B, and C, more preferably satisfy the following relational expressions (i)' and (ii)', and particularly preferably satisfy the following relational expressions (i)" and (ii)".

$(A/C) \times 100 \leq 7$ (i)'

$(B/C) \times 100 \geq 64$ (ii)'

$(A/C) \times 100 \leq 6$ (i)"

$(B/C) \times 100 \geq 68$ (ii)"

The (A/C) and (B/C) being in the above range represents that the propylene chain has a structure which is syndiotactic-rich structure.

For the propylene polymer (A3), the α-olefin having 4 to 20 carbon atoms is particularly preferably 1-butene.

The measurement with $^{13}$C-NMR is carried out specifically in the following manner. A sample product prepared by dissolving 50 mg of a sample in about 0.5 ml of a mixture solvent mixed in the ratio of o-dichlorobenzene/deuterated benzene=5/1, is subjected to a $^{13}$C-NMR measurement at 120° C. using an EX-400 NMR measuring apparatus manufactured by JEOL, LTD., in the measurement mode of single proton pulse decoupling, under the conditions of a pulse width of 4.7 μsec, a pulse interval of 5.5 sec, an observation range (observation width) of 180 ppm, and a chemical shift standard of 34.4 ppm which is a peak at the highest magnetic field among the signals originating from CH (methine) constitutional units derived from α-olefin having 4 to 20 carbon atoms. The integration number is set to 10,000 times or more. When a copolymer contains a constitutional unit derived from 1-butene, a peak at the highest magnetic field of signals originating from CH (methine) of constitutional units derived from 1-butene is defined as 34.4 ppm.

The propylene polymer (A) used in the invention is preferably the propylene polymer (A3) from the viewpoint of particularly excellent vibration-damping property, vibration-preventing property, sound-insulating property, and sound-absorbing property, as well as flexibility, low temperature property, and transparency, of the article for vibration control obtained from the material for vibration control of the invention. In particular, it is more preferable that the propylene polymer (A) is the propylene polymer (A2), and the propylene polymer (A2) is the propylene polymer (A3).

(Process for Producing Propylene Polymer (A))

The propylene polymer (A) is preferably obtained by polymerizing a monomer containing propylene in the presence of a catalyst including a transition metal compound represented by the following general formula (1). Hereinafter, the propylene polymer (A) obtained in such manner also may be referred to as "propylene polymer (A4)".

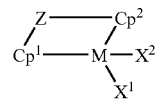

(1)

[wherein, M is Ti, Zr, Hf, Nd, Sm, or Ru, $Cp^1$ and $Cp^2$ are each pi-bonded with M and are each a cyclopentadienyl group, an indenyl group, a fluorenyl group, or derivatives thereof, $Cp^1$ and $Cp^2$ are each a group different from each other, $X^1$ and $X^2$ are each an anionic ligand or a neutral Lewis base ligand, and Z is an atom selected from C, O, B, S, Ge, Si and Sn, or a group containing the atom].

Among the transition metal compounds represented by the above general formula (1), a transition metal compound in which the $Cp^1$ and $Cp^2$ are each a group different from each other is preferable, and a transition metal compound in which any one group of $Cp^1$ and $Cp^2$ is a cyclopentadienyl group or derivatives thereof and the other one of the groups is a fluorenyl group or derivatives thereof is more preferable. For such transition metal compound, diphenylmethylene(cyclopentadienyl)fluorenyl zirconium dichloride is exemplified.

The propylene polymer (A) used in the invention is preferably the propylene polymer (A4) from the viewpoint of particularly excellent vibration-damping property, vibration-preventing property, sound-insulating property, and sound-absorbing property, as well as transparency and abrasion resistance, of the article obtained from the material for vibration control of the invention and the article formed from the material for vibration control of the invention.

In addition, the propylene polymer (A4) is more preferably produced in the presence of at least one catalyst system comprising (a) a transition metal compound represented by the above general formula (1), and (b) at least one compound selected from (b-1) an ionizing ionic compound (a compound which reacts with the transition metal M in the transition metal compound (a) to form an ionic complex);

(b-2) an organoaluminum oxy compound; and (b-3) an organoaluminum compound.

The propylene polymer (A4) is generally copolymerized in a liquid phase. At this time, a hydrocarbon solvent is used in general, but propylene may also be used as a solvent. Copolymerization can be carried out by any of batch method and continuous method.

In the case of conducting copolymerization by the batch method using a metallocene catalyst, the transition metal compound (a) in the polymerization system is used in an amount of usually 0.00005 to 1 mmol, preferably 0.0001 to 0.5 mmol, per 1 liter of the polymerization volume.

The ionized ionic compound (b-1) is used in an amount such that the molar ratio of the ionized ionic compound to the transition metal compound (a) ((b-1)/(a)) is 0.5 to 20, and preferably 1 to 10.

The organoaluminum oxy compound (b-2) is used in an amount such that the molar ratio of aluminum atoms (Al) to the transition metal atom (M) in the transition metal compound (a) (Al/M) is 1 to 10,000, and preferably 10 to 5,000. Further, the organoaluminum compound (b-3) is used in an amount of usually about 0 to 5 mmol, preferably about 0 to 2 mmol, per 1 liter of the polymerization volume.

The copolymerization reaction is usually carried out under the conditions of a temperature in the range of −20 to 150° C., preferably 0 to 120° C., and more preferably 0 to 100° C., and a pressure in the range of more than 0 to 8 MPa, and preferably more than 0 to 5 MPa.

The reaction time (the average residence time, if polymerization is conducted by the continuous method) varies depending on the conditions such as the catalyst concentration, polymerization temperature, or the like, but is usually from 5 minutes to 3 hours, and preferably 10 minutes to 1.5 hours.

The propylene, and the α-olefin used if necessary are respectively fed to the polymerization system in an amount such that the propylene polymer (A) of the specific composition as described above is obtained. During the copolymerization, a molecular weight modifier such as hydrogen or the like can be also used.

When the propylene and the α-olefin used if necessary are copolymerized as described above, the propylene polymer (A) is usually obtained as a polymerization liquid containing the copolymer. This polymerization liquid is treated by conventional methods to obtain the propylene polymer (A).

When the propylene polymer (A) is a copolymer, the propylene polymer (A) is preferably a random copolymer.

The weight average molecular weight (Mw) of the propylene polymer (A) when measured with GPC (o-dichlorobenzene solvent, relative to polystyrene) is for example, 50,000 to 700,000, and preferably 100,000 to 500,000.

The molecular weight distribution (Mw (weight average molecular weight)/Mn (number average molecular weight)) of the propylene polymer (A) when measured with GPC (o-dichlorobenzene solvent, relative to polystyrene) is for example, 1.5 to 3.0, and preferably 1.8 to 2.5.

The intrinsic viscosity [η] of the propylene polymer (A) (measured in decalin at 135° C.) is desirably within the range of usually from 0.01 to 10 dl/g, and preferably 0.05 to 10 dl/g. The intrinsic viscosity within the above range is preferable since a form for damping or preventing vibration can be maintained.

<Propylene Polymer (B)>

The material for vibration control of the invention may further contain the propylene polymer (B).

The meting point of the propylene polymer (B) when measured with DSC is 100° C. or above. The term "melting point measured with DSC" is as defined above.

The tensile modulus of the propylene polymer (B) used in the invention is preferably 400 MPa or more.

The propylene polymer (B) is more preferably at least one kind selected from isotactic polypropylene (B1) and syndiotactic polypropylene (B2). From the viewpoint of balance of properties such as thermal resistance, moldability, processability, or the like, and vibration controllability, the propylene polymer (B) is preferably the isotactic polypropylene (B1). In such case, the syndiotactic polypropylene (B2) may be added, if needed, in an amount of 10 parts by weight or less and preferably 0.1 to 10 parts by weight, to total 100 parts by weight of the propylene polymer (A) and the isotactic polypropylene (B1). As the syndiotactic polypropylene (B2) to be added as an optional component in addition to the propylene polymer (A) and the isotactic polypropylene (B1), a polymer having a melting point (Tm) of 144° C. or below, preferably 140° C. or below when measured with DSC is preferable.

The elastic modulus can be determined by press molding the propylene polymer (B) and then conducting a tensile test according to a method in Example which will be described below. For the press molding, the propylene polymer (B) is preheated at the temperature of 200° C., molded by applying pressure (10 MPa) for 3 minutes, and cooled under pressure (10 MPa) at 20° C. for 5 minutes, to prepare a sheet having the thickness of 1 mm.

First, the isotactic polypropylene (B1) will be described in the following.

The isotactic polypropylene (B1) is a polypropylene, in which the n-decane insoluble part at 23° C. has the isotactic pentad fraction of 0.90 or more, preferably 0.95 or more, as measured by the NMR technique.

The isotactic pentad fraction (mmmm) represents the proportion for the presence of an isotactic sequence in a pentad unit in the molecular chain, which is measured by $^{13}$C-NMR, and is a fraction of the propylene monomer unit located at the center of a sequence in which five propylene monomer units are sequentially meso-bonded. Specifically, it is a value calculated as the fraction of the mmmm peak among the entire absorption peaks in the methyl carbon region observed in the $^{13}$C-NMR spectrum. This isotactic pentad fraction (mmmm) is measured in the following manner.

The mmmm fraction is determined from Pmmmm (the absorption intensity originating from the methyl group in the third unit at a site wherein five propylene units are sequentially isotactically bonded) and PW (the absorption intensity originating from the entire methyl groups in the propylene units) in the $^{13}$C-NMR spectrum according to the following equation (2).

$$mmmm \text{ fraction} = Pmmmm/PW \quad (2)$$

The NMR measurement is performed, for example, in the following manner. That is, 0.35 g of a sample is dissolved under heating in 2.0 ml of hexachlorobutadiene. This solution is filtered through a glass filter (G2), and then introduced into an NMR tube having an internal diameter of 10 mm after adding 0.5 ml of deuterated benzene. Then, $^{13}$C-NMR measurement is performed at 120° C. using a GX-500 NMR measuring apparatus manufactured by JEOL, Ltd. The integration number is 10,000 times or more.

For the isotactic polypropylene (B1), the quantity of n-decane insoluble component at 23° C. is not particularly limited, but is, for example, 99.9 to 80% by weight. Here, the n-decane insoluble component at 23° C. is a value calculated from the weight of a solid phase obtained by immersing 5 g of a sample in boiling n-decane 200 cc for 5 hours to dissolve the sample, then cooling the solution to room temperature, filtering the precipitated solid phase through G4 glass filter, and then drying the obtained component to be measured.

The isotactic polypropylene (B1) may be exemplified by a propylene homopolymer or a copolymer of propylene with an α-olefin having 2 to 20 carbon atoms except propylene. Here, examples of the α-olefin having 2 to 20 carbon atoms except propylene include ethylene, 1-butene, 1-pentene, 1-hexene, 4-methyl-1-pentene, 1-octene, 1-decene, 1-dodecene, 1-tetradecene, 1-hexadecene, 1-octadecene, 1-eicosene and the like, and ethylene or α-olefin having 4 to 10 carbon atoms is preferable.

Such α-olefin may form a random copolymer or a block copolymer with propylene. The constitutional unit derived from this α-olefin may be contained in the polypropylene in a proportion of 40% by mole or less, preferably 20% by mole or less.

It is desirable that the isotactic polypropylene (B1) has a melt flow rate (MFR) in the range of 0.01 to 1000 g/10 min, preferably 0.05 to 500 g/10 min, as measured at 230° C. under a load of 2.16 kg according to ASTM D 1238.

The isotactic polypropylene (B1) can be produced by, for example, conducting polymerization using a Zigler catalyst system comprising (a) a solid catalyst component containing magnesium, titanium, halogen and an electron donor as the essential components, (b) an organoaluminum compound, and (c) an electron donor. Further, the same can be also obtained using a metallocene catalyst.

Next, the syndiotactic polypropylene (B2) will be described below.

The syndiotactic polypropylene (B2) may comprise a small amount, for example, 10% by mole or less, preferably 5% by mole or less, of ethylene, α-olefin having 4 or more carbon atoms, or the like being copolymerized therein. As the syndiotactic polypropylene (B2), syndiotactic homopolypropylene is particularly preferable. The catalyst used in the preparation of such syndiotactic polypropylene may be exemplified by the metallocene catalysts described in Japanese Unexamined Patent Application Publication No. 10-300084.

Here, the syndiotactic pentad (rrrr, pentad syndiotacticity) fraction is 0.5 or greater, preferably 0.6 or greater, more preferably 0.7 or greater, and particularly preferably 0.8 or greater. A polypropylene with a syndiotactic pentad fraction of 0.5 or greater has excellent thermal resistance and moldability, and has good characteristics as a crystalline polypropylene and is preferable.

In addition, this syndiotactic pentad fraction (rrrr) is measured in the following manner. The rrrr fraction is determined from Prrrr (the absorption intensity originating from the methyl group in the third unit at a site wherein five propylene units are sequentially syndiotactically bonded) and PW (the absorption intensity originating from the entire methyl groups in the propylene units) in the $^{13}$C-NMR spectrum according to the following equation (3).

$$rrrr \text{ fraction} = Prrrr/PW \quad (3)$$

The NMR measurement is performed, for example, as follows. That is, 0.35 g of a sample is dissolved under heating in 2.0 ml of hexachlorobutadiene. This solution is filtered through a glass filter (G2), and then is introduced into an NMR tube having an internal diameter of 10 mm after adding 0.5 ml of deuterated benzene. Then, $^{13}$C-NMR measurement is performed at 120° C. using a GX-500 NMR measuring apparatus manufactured by JEOL, Ltd. The integration number is 10,000 times or more.

Furthermore, it is desirable that the melt flow rate (MFR, 190° C., under a load of 2.16 kg) of the syndiotactic polypropylene (B2) is 0.001 to 1000 g/10 min, and preferably 0.01 to 500 g/10 min. With the MFR in this range, the syndiotactic polypropylene (B2) exhibits good fluidity, and it is easy to blend this syndiotactic polypropylene (B2) with other components. In addition, it is also likely to obtain an article having excellent mechanical strength from the resultant composition.

The propylene polymer (B) is desirably used in an amount such that the weight ratio [(A):(B)] of the propylene polymer (A) and the propylene polymer (B) is 100 to 40:0 to 60, preferably (A):(B)=99 to 40:1 to 60, and more preferably 90 to 50:10 to 50 [total amount of (A) and (B) is 100 parts by weight].

The material for vibration control of the invention preferably contains the propylene polymer (B) from the viewpoint of giving a good balance of properties for damping vibration, preventing vibration, insulating sound, and absorbing sound, and thermal resistance to the material itself and the article thereof.

<Ethylene/α-Olefin Copolymer (C)>

The material for vibration control of the invention may further contain ethylene/α-olefin copolymer (C) (hereinafter, also may be referred to as "component (C)"). The ethylene/α-olefin copolymer (C) is a non-crystalline or low-crystalline random or block copolymer of ethylene and α-olefin having 3 to 20 carbon atoms. The ethylene/α-olefin copolymer (C) has a density (ASTMD 1505) of usually 0.857 g/cm$^3$ to 0.910 g/cm$^3$, preferably 0.860 to 0.905 g/cm$^3$, and more preferably 0.880 to 0.905 g/cm$^3$, and has a melt flow rate (MFR; ASTMD 1238, 190° C., load of 2.16 kg) of usually 0.1 to 40 g/10 min, and preferably 0.5 to 20 g/10 min.

The α-olefin which is copolymerized with ethylene is an α-olefin having 3 to 20 carbon atoms, and may be specifically exemplified by propylene, 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene, 4-methyl-1-pentene, or the like. Among these, the α-olefin having 3 to 10 carbon atoms is preferable, and propylene, 1-butene, 1-hexene, and 1-octene are particularly preferable. Such α-olefins can be used alone or in combination of two or more kinds.

In addition, it is desirable that the ethylene/α-olefin copolymer (C) contains the constitutional unit derived from ethylene in an amount of 75 to 95 mol %, and the constitutional unit derived from α-olefin having 3 to 20 carbon atoms in an amount of 5 to 25 mol %. Here, the total amount of the structures derived from ethylene and structures derived from α-olefin is 100 mol %.

In addition to those constitutional units, the ethylene/α-olefin copolymer (C) may also contain constitutional units derived from other polymerizable monomers within the scope of not disturbing the purpose of the invention.

Specific examples of the ethylene/α-olefin copolymer (C) include an ethylene/propylene copolymer, an ethylene/1-butene copolymer, an ethylene/propylene/1-butene copolymer, an ethylene/propylene/ethylidene norbornane copolymer, an ethylene/1-hexene copolymer, an ethylene/1-octene copolymer, and the like. Among these, the ethylene/propylene copolymer, the ethylene/1-butene copolymer, the ethylene/1-hexene copolymer, and the ethylene/1-octene copolymer are preferably used, and the ethylene/1-butene copolymer is particularly preferably used. These copolymers are random or block copolymers, but are particularly preferably random copolymers.

The crystallinity of the ethylene/α-olefin copolymer (C) is usually 40% or less, and preferably 10 to 30%, when measured by X-ray diffraction method.

The molecular weight distribution (Mw/Mn) of the ethylene/α-olefin copolymer (C) determined by Gel Permeation Chromatography (GPC) is desirably within the range of 1.5 to 3.0, and preferably 1.7 to 2.5. When the ethylene/α-olefin copolymer (C) with the molecular weight distribution (Mw/Mn) in the above range is used, a material for vibration control can be obtained from which an article excellent in permanent compression setting and moldability is prepared, particularly at the time of crosslinking. Such ethylene/α-olefin copolymer (C) exhibits properties as normal elastomer.

When the ratio (MFR$_{10}$/MFR$_2$) of a melt flow rate (MFR$_{10}$) measured under the condition of a load of 10 kg and a melt flow rate (MFR$_2$) measured under the condition of a load of 2.16 kg, in accordance with ASTM D 1238 at 190° C., satisfies the following relational expression $$MFR_{10}/MFR_2 \leq 6.0, \text{ and}$$

preferably satisfies $$7 \leq MFR_{10}/MFR_2 \leq 15,$$

and when the molecular weight distribution (Mw/Mn) and the melt flow rate ratio satisfy the following relational expression $$Mw/Mn + 5.0 \leq MFR_{10}/MFR_2,$$

a material for vibration control can be obtained from which a foam product (crosslinked foam product) which is highly elastic and excellent in permanent compression setting and moldability is prepared at a high foaming ratio, that is at a low density, particularly when carrying out a crosslinked foaming.

The intensity ratio ($T\alpha\beta/T\alpha\alpha$) of $T\alpha\beta$ to $T\alpha\alpha$ in $^{13}$C-NMR spectrum of the ethylene/α-olefin copolymer (C) is 0.5 or less, and preferably 0.4 or less.

Here, $T\alpha\alpha$ and $T\alpha\beta$ in $^{13}$C-NMR spectrum are a peak intensity of $CH_2$ in a constitutional unit derived from α-olefin having 3 or more carbon atoms, and means two types of $CH_2$ which are at different positions to tertiary carbons from each other as shown below.

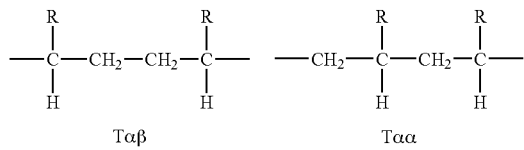

Such $T\alpha\beta/T\alpha\alpha$ intensity ratio can be obtained as in the following manner. The $^{13}$C-NMR spectrum of the ethylene/α-olefin copolymer (C) is measured, for example, using an OL-GX 270 NMR measuring apparatus manufactured by JEOL, Ltd. The measurement is carried out under the conditions of 67.8 MHz, 25° C., and d6-benzene (128 ppm) basis using a mixture solution of hexachlorobutadiene/d6-benzene=2/1 (volume ratio) which is prepared to be a 5 wt % sample concentration. The measured $^{13}$C-NMR spectrum is analyzed in accordance with the proposal of Lindemann Adams (Analysis Chemistry 43, p 1245 (1971)) and J. C. Randall (Review Macromolecular Chemistry Physics, C29, 201 (1989)), and thus the $T\alpha\beta/T\alpha\alpha$ intensity ratio is obtained.

It is preferable that the B value of the ethylene/α-olefin copolymer (C) determined from $^{13}$C-NMR spectrum and the following general formula (4) is 0.90 to 1.5, and preferably 0.95 to 1.2.

$$B \text{ value} = [POE]/(2 \cdot [PE][PO]) \quad (4)$$

(wherein [PE] is a contained molar fraction of constitutional unit derived from ethylene in the copolymer (C), [PO] is a contained molar fraction of constitutional unit derived from α-olefin in the copolymer (C), and [POE] is a ratio of ethylene/α-olefin sequence number to an entire dyad sequence in the copolymer (C)).

The B value is an index to show a distribution state of the ethylene and the α-olefin having 3 to 20 carbon atoms in an ethylene/α-olefin copolymer, and can be determined on the basis of the report written by J. C. Randall (Macromolecules, 15, 353 (1982)), J. Ray (Macromolecules, 10, 773 (1977)) et al.

The B value of the ethylene/α-olefin copolymer (C) is usually determined by carrying out a measurement of $^{13}$C-NMR spectrum of a sample provided by uniformly dissolving about 200 mg of an ethylene/α-olefin copolymer in 1 ml of hexachlorobutadiene in a sample tube of 10 mmϕ, under the conditions of a measurement temperature of 120° C., a measurement frequency of 25.05 MHz, a spectrum width of 1500 Hz, a pulse repetition time of 4.2 sec, and a pulse width of 6 μsec.

The larger B value gives a shorter block sequence of ethylene or α-olefin copolymer, and the ethylene and α-olefin are uniformly distributed, thus indicates that the composition distribution of the copolymer rubber is narrow. In addition, the B value smaller than 1.0 gives a wider composition distribution of the ethylene/α-olefin copolymer, and thus leaves a negative point of lowered handlability.

The ethylene/α-olefin copolymer (C) can be produced in accordance with the known methods using a vanadium-based catalyst, a titanium-based catalyst, or a metallocene based catalyst. In particular, the solution polymerization method disclosed in Japanese Unexamined Patent Application Publication No. 62-121709 is preferable.

When using the ethylene/α-olefin copolymer (C), the ethylene/α-olefin copolymer (C) is used in a proportion of 1 to 500 part(s) by weight, preferably 10 to 100 parts by weight, and more preferably 10 to 50 parts by weight, to 100 parts by weight in total of the propylene copolymer (A) and the propylene polymer (B) which is used if necessary.

It is preferable for the material for vibration control of the invention to contain the ethylene/α-olefin copolymer (C) in such proportion, since, in such a case, the obtained article has a good balance of properties for damping vibration, preventing vibration, insulating sound, and absorbing sound, and an impact resistance at low temperature.

<Ethylene/Polar Monomer Copolymer (D)>

The material for vibration control according to the invention may further contain the ethylene/polar monomer copolymer (D). Examples of the polar monomer include unsaturated carboxylic acid, salts thereof, esters thereof, amides thereof, vinylester, carbon monoxide, and the like. More specific examples include unsaturated carboxylic acid such as acrylic acid, methacrylic acid, fumaric acid, itaconic acid, monomethyl maleate, monoethyl maleate, maleic anhydride and itaconic acid anhydride; unsaturated carboxylic acid's monovalent metal salts of lithium, sodium, potassium, or the like, and multivalent metal salts of magnesium, calcium, zinc, or the like; unsaturated carboxylic esters such as methyl acrylate, ethyl acrylate, isopropyl acrylate, isobutyl acrylate, n-butyl acrylate, isooctyl acrylate, methyl methacrylate, ethyl methacrylate, isobutyl methacrylate and dimethyl maleate; vinyl esters such as vinyl acetate and vinyl propionate; carbon monoxide; sulfur dioxide; and the like, and these may be used alone or in combination of two or more kinds.

More specifically, as the ethylene/polar monomer copolymer (D), the ethylene/unsaturated carboxylic acid copolymer such as an ethylene/acrylic acid copolymer and an ethylene/methacrylic acid copolymer; ionomers obtained by partially or entirely neutralizing the carboxyl groups in the ethylene/unsaturated carboxylic acid copolymer with the above metals; an ethylene/unsaturated carboxylic ester copolymer such as an ethylene/methyl acrylate copolymer, an ethylene/ethyl acrylate copolymer, an ethylene/methyl methacrylate copolymer, an ethylene/isobutyl acrylate copolymer, and an ethylene/n-butyl acrylate copolymer; an ethylene/unsaturated carboxylic ester/unsaturated carboxylic acid copolymer such as an ethylene/isobutyl acrylate/methacrylic acid copolymer and an ethylene/nbutyl acrylate/methacrylic acid copolymer, and ionomers obtained by partially or entirely neutralizing those above carboxyl groups with the metals; an ethylene/vinylester copolymer such as an ethylene/vinyl acetate copolymer; and the like can be exemplified as an representative example.

Among these, the copolymer of ethylene and a polar monomer selected from unsaturated carboxylic acid, salts thereof, esters thereof, and vinyl acetate is preferable, the ionomer of ethylene/(meth)acrylic acid copolymer, the ionomer of ethylene/(meth)acrylic acid/(meth)acrylic acid ester copolymer, and ethylene/vinyl acetate copolymer is particularly preferable, and the ethylene/vinyl acetate copolymer is most preferable.

For the ethylene/polar monomer copolymer (D), the polar monomer is contained in the range of 1 to 50% by weight, and particularly preferably from 5 to 45% by weight, which may differ according to the kind of the polar monomer.

In consideration of the molding processability and mechanical strength, the ethylene/polar monomer copolymer (D) having the melt flow rate of 0.05 to 500 g/10 min under a load of 2160 g at 190° C., and particularly from 0.5 to 20 g/10 min, is preferable. Copolymers of ethylene, and unsaturated carboxylic acid, unsaturated carboxylic ester, vinyl ester, or the like, can be obtained by carrying out a radical copolymerization at high temperature and under a high pressure. In addition, the copolymer (ionomer) of ethylene and a metal salt of unsaturated carboxylic acid can be obtained by reacting an ethylene/unsaturated carboxylic acid copolymer with a corresponding metal compound.

When the ethylene/polar monomer copolymer (D) used in the invention is an ethylene/vinyl acetate copolymer, the vinyl acetate is contained in the ethylene/vinyl acetate copolymer in the amount of 10 to 30% by weight, preferably 15 to 30% by weight, and more preferably 15 to 25% by weight.

The melt flow rate (MFR; ASTM D 1238, 190° C., load of 2.16 kg) of the ethylene/vinyl acetate copolymer is from 0.1 to 50 g/10 min, preferably from 0.5 to 20 g/10 min, and more preferably from 0.5 to 5 g/10 min.

When using the ethylene/polar monomer copolymer (D), the ethylene/polar monomer copolymer (D) is used in a proportion of 1 to 500 part(s) by weight, preferably 10 to 100 parts by weight, and more preferably 10 to 50 parts by weight, to 100 parts by weight in total of the propylene copolymer (A) and the propylene polymer (B) which is used if necessary.

It is preferable for the material for vibration control of the invention to contain the ethylene/polar monomer copolymer (D) in such proportion, since, in such a case, the obtained article has a good balance of properties for damping vibration, preventing vibration, insulating sound, and absorbing sound, and an impact resistance at low temperature.

(Modification of Polymer)

Any one or two or more of the propylene polymer (A), the propylene polymer (B), the ethylene/α-olefin copolymer (C), and ethylene/polar monomer copolymer (D) may partially or entirely be graft modified with an unsaturated carboxylic acid and/or anhydrides thereof, or with a silane coupling agent. For example, it may be graft modified with an unsaturated carboxylic acid and/or anhydrides thereof, or with a silane coupling agent. According to the graft medication with unsaturated carboxylic acid or a silane coupling agent, an adhesivity of an article formed from the material for vibration control of the invention with a rigid substrate is further improved. A graft ratio is preferably within the range of 0.01 to 10% by weight, and particularly from 0.05 to 6% by weight. The graft modification can be carried in accordance with the method of, for example, melt-kneading in the presence of unsaturated carboxylic acid or the like and a radical initiator. The graft ratio is an amount of grafted unsaturated carboxylic acid or a silane coupling agent to the total graft modified substance, shown in weight %. The graft ratio can be determined using $^{13}$C-NMR.

Examples of the unsaturated carboxylic acid or anhydrides thereof include acrylic acid, methacrylic acid, maleic acid, itaconic acid, citraconic acid, bicyclo (2,2,1)hept-2-ene-5,6-dicarboxylic acid, itaconic acid anhydride, anhydrous citraconic acid, anhydrous hymic acid, bicyclo(2,2,2)oct-5-ene-2,3-dicarboxylic anhydride, 4-methylcyclohex-4-ene-1,2-dicarboxylic anhydride, 1,2,3,4,5,8,9,10-octahydronaphthalene-2,3-dicarboxylic anhydride, bicyclo (2,2,1)oct-7-ene-2,3,5,6-tetracarboxylic acid-2,3,5,6-dianhydride, 7-oxabicyclo(2,2,1)hept-5-ene-2,3-dicarboxylic anhydride, and the like, and metal salts thereof can also be used. Among these, the maleic anhydride is particularly preferably used.

Examples of the silane coupling agent include vinyl triethoxysilane, methacryloyloxy trimethoxysilane, γ-methacryloyloxypropyl trimethoxysilane, methacryloyloxy cyclohexyl trimethoxysilane, γ-methacryloyloxypropyl triacetyloxysilane, methacryloyloxy triethoxysilane, γ-methacryloyloxypropyl triethoxysilane, and the like.

<Inorganic Filler (Z)>

The material for vibration control of the invention may further contain the inorganic filler (Z).

The inorganic filler is not particularly limited, but may be exemplified by hydrous metal oxide, natural silicic acid, or natural silicate, carbonate, sulfate, oxide, synthesis silicic acid or synthesis silicate, and the like.

The hydrous metal oxide can be exemplified by aluminum hydroxide, magnesium hydroxide, and the like;

the natural silicic acid or silicate can be exemplified by talc, talc fine powder, kaolinite, calcined clay, mica, pyrophyllite, sericite, wollastonite, and the like;

the carbonate can be exemplified by calcium carbonate, precipitated calcium carbonate, heavy calcium carbonate, magnesium carbonate, and the like;

the sulfate can be exemplified by barium sulfate, magnesium sulfate, and the like;

the oxide can be exemplified by zinc oxide, zinc white, magnesium oxide, antimony oxide, and the like; and the synthesis silicic acid or silicate can be exemplified by hydrous calcium silicate, hydrous aluminum silicate, hydrous silicic acid, anhydrous silicic acid, and the like.

The inorganic filler (Z) may be an inorganic flame retardant, and can be exemplified by a commonly known flame retardant such as an antimony-based flame retardant (e.g., antimony trioxide), and a hydrous metal oxide-based flame retardant (e.g., magnesium hydroxide).

When using the inorganic filler (Z), the inorganic filler (Z) is used in a proportion of usually 1 to 1,000 part(s) by weight, and preferably 10 to 500 parts by weight, to 100 parts by weight in total of the propylene copolymer (A), the propylene polymer (B), the ethylene/α-olefin copolymer (C), and the ethylene/polar monomer copolymer (D).

<Flame Retardant (E)>

The material for vibration control according to the invention may further contain the flame retardant (E).

The flame retardant (E) is not particularly limited as long as it is a flame retardant other than the ones mentioned for the inorganic filler (Z), which can be exemplified by a commonly known organic flame retardant such as a halogen-based flame retardant (e.g., decabromodiphenyl ether), and a phosphorus-based flame retardant.

When using the flame retardant (E), the flame retardant (E) is used in a proportion of usually 1 to 1,000 part(s) by weight, and preferably 10 to 500 parts by weight, to 100 parts by weight in total of the propylene copolymer (A), the propylene polymer (B), the ethylene/α-olefin copolymer (C), and the ethylene/polar monomer copolymer (D).

<Foaming Agent (F)>

The material for vibration control according to the invention may further contain the foaming agent (F). Examples of the foaming agent include chemical foaming agents, specifically, an azo compound such as azodicarbonamide (ADCA), 1,1'-azobis(1-acetoxy-1-phenylethane), dimethyl-2,2'-azobisbutyrate, dimethyl-2,2'-azobisisobutyrate, 2,2'-azobis(2,4, 4-trimethylpentane), 1,1'-azobis(cyclohexane-1-carbonitrile), and 2,2'-azobis[N-(2-carboxyethyl)-2-methylpropionamidine];

a nitroso compound such as N,N'-dinitrosopentamethylenetetramine (DPT);

a hydrazine derivative such as 4,4'-oxybis(benzensulfonyl hydrazide), and diphenylsulphon-3,3'-disulfonyl hydrazide;

a semicarbazide compound such as p-toluenesulfonyl semicarbazide;

a thermally decomposable organic type foaming agent such as trihydrazino triazine, and further bicarbonate such as sodium hydrogen carbonate, ammonium hydrogen carbonate, and carbonate such as sodium carbonate, and ammonium carbonate;

a nitrite salt such as ammonium nitrite; and a thermally decomposable inorganic foaming agent such as a hydrogen compound. Among these, azodicarbonamide (ADCA) and sodium hydrogen carbonate are particularly preferable.

In addition, a physical foaming agent (a foaming agent which is not always accompanied with a chemical reaction at the time of foaming) such as various aliphatic hydrocarbons e.g., methanol, ethanol, propane, butane, pentane, hexane, etc.; various chlorohydrocarbons e.g., dichloroethane, dichloromethane, carbon tetrachloride, etc.; and a organic physical foaming agent such as various fluorination chlorohydrocarbons e.g., chlorofluorocarbon, and a inorganic physical foaming agent e.g., air, carbon dioxide, nitrogen, argon, water, etc.; can also be used as the foaming agent (F) in the invention. Among these, carbon dioxide, nitrogen, and argon are mostly suited as the agent, as there is no need of converting into a vapor, and as they cost less and causes extremely low possibility of environmental pollution and ignition.

The physical foaming agent used as the foaming agent (F) of the invention can prevent a mold staining at the time of crosslinked foaming of a composition as there is no decomposition residue of the foaming agent. Moreover, the physical foaming agent has an excellent kneadability as it is not a powder. If the physical foaming agent is used, an off-odor (such as smell of ammonia produced at the time of ADCA decomposition) resulted from the obtained crosslinked foam can be prevented.

In the invention, the above-mentioned chemical foaming agent can also be used in combination within the scope of not giving a bad effect such as a bad smell, mold staining, etc.

For the storing method of the physical foaming agent, in the case of a small production, carbon dioxide, nitrogen, or the like is used in the state of being kept in a tank, and then supplied via a pressure reducing valve to an injection molding machine, extrusion molding machine, etc., or can be supplied by increasing the pressure using a pump or the like to an injection molding machine, extrusion molding machine, etc.

In the case of a system for a large production of the foaming product, a storage tank for liquid carbon dioxide, liquid nitrogen, or the like, is provided, vaporization is carried out through a heat exchanger, and the vapor is supplied by a pipe via a pressure reducing valve to an injection molding machine, extrusion molding machine, etc.

When the physical foaming agent is a liquid, the storage pressure is preferably in the range of 0.13 to 100 MPa. If the pressure is too low, the compression is reduced thus the injection to an injection molding machine, extrusion molding machine, etc. cannot be achieved, and if the pressure is too high, the equipment has to be maximized and becomes more complicated as the pressure resistance of the storage equipment has to be increased, thus is not preferable. The storage pressure defined here means a pressure required for supplying the vapor to a pressure reducing valve after the vaporization.

When using a chemical foaming agent as the foaming agent (F), the chemical foaming agent is used in a proportion of usually 0.0001 to 10 parts by weight, and preferably 0.01 to 8 parts by weight, to 100 parts by weight in total of the propylene copolymer (A), the propylene polymer (B), the ethylene/α-olefin copolymer (C), and the ethylene/polar monomer copolymer (D). However, the amount of the chemical foaming agent to be used can be appropriately reduced or increased in accordance with the aimed foaming ratio since the amount of gas generated varies depending on the kind/grade of the foaming agent used.

When using a physical foaming agent as the foaming gent (F), the amount of the physical foaming agent to be added can be appropriately selected in accordance with the desired foaming ratio.

In the invention, a blowing activator (f) may also be used together with the foaming agent (F), if necessary. The blowing activator (f) works for reducing the decomposition temperature and promoting the decomposition of the foaming agent (F), and equalizing the foam, and the like. The blowing activator (f) can be exemplified by an organic acid such as zinc oxide (ZnO), zinc stearate, salicylic acid, phthalic acid, stearic acid, oxalic acid, and the like, urea, and derivatives thereof.

<Crosslinking Agent (G)>

The material for vibration control according to the invention may further contain the crosslinking agent (G). Examples of the organic peroxide used as the crosslinking agent (G) specifically includes dicumyl peroxide, di-t-butyl peroxide, 2,5-dimethyl-2,5-di-(t-butyl peroxy)hexane, 2,5-dimethyl-2,5-di-(t-butyl peroxy)hexyne-3,1,3-bis(t-butyl peroxy isopropyl)benzene, 1,1-bis(t-butyl peroxy)-3,3,5-trimethylcyclohexane, n-butyl-4,4-bis(t-butyl peroxy)valerate, benzoyl peroxide, p-chlorobenzoyl peroxide, 2,4-dichlorobenzoyl peroxide, t-butyl peroxybenzoate, t-butyl perbenzoate, t-butyl peroxyisopropyl carbonate, diacetyl peroxide, lauroyl peroxide, t-butyl cumyl peroxide, and the like.

When using the crosslinking agent (G), the crosslinking agent (G) is used in a proportion of usually 0.001 to 10 parts by weight, preferably 0.01 to 5 parts by weight, more preferably 0.1 to 1.5 parts by weight, and even more preferably 0.2 to 1.0 parts by weight, to 100 parts by weight in total of the propylene copolymer (A), the propylene polymer (B), the ethylene/α-olefin copolymer (C), and the ethylene/polar monomer copolymer (D). Here, components other than (A) are optional components, and thus one or more component(s) from (B), (C), and (D), may be 0 part by weight. When the organic peroxide is used in the proportion mentioned above, a crosslinked article having a moderate crosslinked structure can be obtained. In addition, the crosslinking agent (G) is used together with a crosslinking auxiliary agent (g) in the proportion mentioned above, a crosslinked article having more moderate crosslinked structure can be obtained.

(Crosslinking Auxiliary Agent (g))

Examples of the crosslinking auxiliary agent (g) specifically include an auxiliary agent for peroxy crosslinking such as sulfur, p-quinone dioxime, p,p'-dibenzoyl quinone dioxime, N-methyl-N-4-dinitroso aniline, nitrosobenzene, diphenylguanidine, and trimethylolpropane-N,N'-m-phenylenedimaleimide; and preferably include divinylbenzene, triallyl cyanurate (TAC), and triallyl isocyanurate (TAIC). Further examples include a polyfunctional methacrylate monomer such as ethylene glycol dimethacrylate, diethylene glycol dimethacrylate, polyethylene glycol dimethacrylate, trimethylolpropane trimethacrylate, and allyl methacrylate, a polyfunctional vinyl monomer such as vinyl butyrate, and vinyl stearate, and the like. Among these, the triallyl cyanurate (TAC) and the triallyl isocyanurate (TAIC) are preferable.

In the invention, the crosslinking auxiliary agent (g) is desirably used in an amount such that the weight ratio [(G)/(g)] of the crosslinking auxiliary agent (g) and the crosslinking agent (G) is 1/30 to 20/1, and preferably 1/20 to 10/1.

<Tackifier (H)>

The material for vibration control according to the invention may further contain a tackifier (H). Examples of the tackifier (H) include rosin, modified rosin, rosin ester, a terpene resin, a terpene phenol resin, a terpene resin modified with aromatic hydrocarbon, aliphatic petroleum resin, alicyclic petroleum resin, aromatic petroleum resin, a cumarone-indene resin, styrenic resin, cyclopentadiene resin, phenolic resin, xylene resin, and the like.

The tackifier (H) has a molecular weight in the range of about 100 to 10,000, and exhibits a plasticization effect on olefin resins. The molecular weight is a number average molecular weight (Mn) which can be measured with GPC. In the past, the vibration damping or preventing materials for a light weighed product is required to include plasticizer or tenderizer in a large quantity to reduce the rigidity, but if the resin substance which is in the category of oligomer is used as above, the rigidity can be reduced without causing a deteriorated permanent compression setting property or bleeding at high temperature, and at the same time, properties for insulating and absorbing sound, and damping and preventing vibration can be improved. In addition, the tackifier (H) has the softening point measured by the ring and ball method preferably in the range of 50 to 160° C., and more preferably in the range of 60 to 160° C.

When using the tackifier (H), the tackifier (H) is used in a proportion of usually 5 to 50 parts by weight, preferably 5 to 30 parts by weight, and more preferably 10 to 20 parts by weight, to 100 parts by weight in total of the propylene copolymer (A), the propylene polymer (B), the ethylene/α-olefin copolymer (C), and the ethylene/polar monomer copolymer (D).

The material for vibration control according to the invention, if necessary, may further contain an additive such as weather resistance stabilizer, thermal resistance stabilizer, antistatic agent, anti-slipping agent, anti-blocking agent, anti-fogging agent, lubricant, pigment, dye, plasticizer, anti-aging agent, hydrochloric acid absorbent, antioxidant, and the like.

It is preferable that the material for vibration control of the invention satisfies 1 or more of, more preferably 2 or more of, even more preferably 3 of the following properties (a) to (c) without both crosslinking agent (G) and foaming agent (F):

(a) A loss tangent (tan δ) peak is shown within the range of −25 to 25° C. according to the dynamic viscoelasticity measurement (frequency=10 rad/s) in a torsion mode, and its value is 0.5 or more, (b) A needle penetration temperature (° C.) measured according to JIS K7196 is from 100 to 168° C., (c) A residual strain is 20% or less, which is determined after the material is 100% strained with an interval between chucks of 30 mm and a stress rate of 30 mm/min, maintained for 10 minutes and released for 10 minutes.

A specimen used when measuring properties in above (a) to (b) is a press article having the width of 10 mm, length of 45 mm, and thickness of 2 mm. The press molding is performed to prepare a sheet having the thickness of 2 mm by preheating the material for vibration control at the temperature of 200° C., then subjecting to molding under pressure (10 MPa) for 3 minutes, and cooling at 20° C. for 5 minutes under pressure (10 MPa).

A specimen for measuring properties in above (c) is an article formed by press molding (dumbbell-shaped) having the length (L0) of 50 mm, width of 5 mm, and thickness of 1 mm. The press molding is performed to prepare a sheet having the thickness of 1 mm by preheating the material for vibration control at the temperature of 200° C., then subjecting to molding under pressure (10 MPa) for 3 minutes, and cooling at 20° C. for 5 minutes under pressure (10 MPa).

Article for Vibration Control

The article for vibration control according to the invention (hereinafter, also may be referred to as "article of the invention") is obtained from the material for vibration control of the invention mentioned above, and/or comprises the material for vibration control of the invention mentioned above.

A form of the article of the invention can be exemplified by a film, a sheet, a coated film, or the like.

For molding into a sheet form, for example, the material for vibration control of the invention is melted and the thickness is uniformly controlled by using a doctor knife, roller, or T-die, to form a sheet.

For molding into a coated film, for example, the material for vibration control of the invention is coated by brushing, or sprayed, to form a coated film.

The article of the invention can be applied for various inorganic or organic substrates in the form of a film, sheet, or coated film described above. For example, a sheet can be used by placing between a floor and a floor pillar, inserting under a particle board, adhering or firmly attaching to a rigid substrate such as a metal plate, glass, etc., and placing between a particle board and glass.

The article for vibration control of the invention may be a foam product or may not be a foam product. In addition, the article of the invention may be a crosslinked product, or may be a non-crosslinked product.

Since the article for vibration control of the invention is obtained from the material for vibration control of the invention and/or formed from the material for vibration control of the invention, it has an excellent vibration-damping property, vibration-preventing property, sound-insulating property, and sound-absorbing property.

Multilayer Laminate for Vibration Control

The multilayer laminate for vibration control (hereinafter, also may be simply referred to as "multilayered laminate") has a layer (hereinafter, also may be simply referred to as "vibration controlling article-layer") comprising the article for vibration control according to the invention. This layer may be a monolayer or in two or more layers.

The thickness of the vibration controlling article-layer is not particularly limited, and can be appropriately selected according to its purpose, but is usually from 0.1 mm to 100 mm.

A specific configuration of the multilayer laminate for vibration control of the invention can be exemplified by the followings:

a multilayered laminate in which the vibration controlling article-layer is laminated on a substrate, a multilayered laminate in which the vibration controlling article-layer is laminated on a substrate and a substrate layer is further laminated thereon, a multilayered laminate in which substrate/vibration controlling article-layer/substrate/vibration controlling article-layer/substrate are laminated in the said order, a multilayered laminate in which substrate/vibration controlling article-layer (/substrate/vibration controlling article-layer)$_n$/substrate are laminated in the said order (n is an integer of 2 or more, e.g., 2 to 10).

In the above exemplification, when there are two or more of the vibration controlling article-layer, the vibration controlling article-layer may be the same or different from each other. When there are two or more of the substrate layer, the substrate layer may be the same or different from each other.

The substrate can be exemplified by metal plates such as various steel plates, an aluminum plate and a copper plate, a glass plate, a plywood laminate, a plaster board, a cement concrete board, a cement mortar board, a slate sheet, a fiber reinforced resin plate (FRP), a plastic plate such as a polycarbonate plate, a polyethylene terephthalate plate, and an acrylic plate, a nonwoven fabric, a fabric, or the like. In particular, the substrate is preferably exemplified by a metal plate, a glass plate, a plywood laminate, a plaster board, a cement concrete board, a cement mortar board, a slate sheet, a fiber reinforced resin plate (FRP), and a plate comprising a polymer having a bending elastic modulus of 500 MPa or more and 10,000 MPa or less when measured according to ASTM D 790 (e.g., a polycarbonate plate, a polyethylene terephthalate plate, and an acrylic plate). When the multilayer laminate for vibration control of the invention is a laminate with a glass plate, the laminate can be widely used as for a laminated glass or multilayered glass, and for a safety glass.

In the article according to the invention, the surface of the vibration controlling article-layer may be provided with an adhesive layer of an ethylene/methacrylic acid copolymer, ionomers thereof, an ethylene/vinyl acetate copolymer, and other polymers (e.g., modified nylon, modified polyolefins, etc.).

The production of the vibration control laminate of the invention is not particularly limited, but can be performed by placing the vibration controlling article-layer by adhering onto a substrate, and further placing a substrate layer thereon; or by a process which comprises placing the laminate of the vibration controlling article-layer and a substrate layer on the substrate, and applying heat to a whole resulting laminate to adhere the vibration controlling article-layer by melting.

Since such vibration control multilayered article according to the invention is provided with a layer comprising the article for vibration control, it has excellent vibration controllability such as vibration-damping property, vibration-preventing property, sound-insulating property, and sound-absorbing property.

The article for vibration control of the invention can be used for, for example, materials for vibration control such as for audio system, house furnishings, and washing machines, footwear or parts for footwear (e.g., shoe bottom sole, shoe midsole, shoe innersole, etc.), sporting goods or parts for sporting goods, housing materials (floor material, wall material, etc.), building materials, optics/information/electronic parts, automobile components, appliance/OA parts, and the like.

When the article for vibration control of the invention is foam, its use is not particularly limited, but can be preferably exemplified by materials for vibration control for an audio system, house furnishings, washing machines or the like.

The foam according to the invention can also preferably used for footwear or parts for footwear (e.g., shoe bottom sole, shoe midsole, shoe innersole, etc.).

When the control vibration material of the invention is used as a monolayer of the laminate, the laminate can be used, for example, for housing materials (floor material, wall material, etc.), and building materials.

EXAMPLES

Hereinafter, the present invention will be described in more detail with reference to Examples, but the invention is not intended to be limited by the Examples.

1. Thermal Resistance (TMA): Softening Temperature (° C.);

The softening temperature (° C.) was determined from a TMA curve according to JIS K7196 using a specimen having a thickness of 1 mm, at a heating rate of 5° C./min, by applying a pressure of 0.2 MPa onto a flat indenter with 1.8 mm$\phi$. In the present specification, this softening temperature may be referred to as TMA.

2. Haze (%);

The haze was measured with a digital turbidimeter "NDH-20 D" manufactured by Nippon Denshoku Industries Co., Ltd., using a 1 mm-thick specimen.

3. Rebound Resilience (%);

The rebound resilience (%) was calculated according to JIS K6255 using a circular-shaped press sheet having a thickness of 15 mm and a diameter of 30 mm. The measuring temperature is 23° C. A smaller value gives a more excellent vibration-damping property.

4. Izod Impact Strength;

The Izod impact strength was determined by performing an impact test under the following conditions according to ASTM D-256, and using a specimen prepared by injection molding at a injection temperature of 200° C. and a mold temperature of 40° C. using an injection molding machine (IS55EPN manufactured by Toshiba Machine Co., Ltd.).

<Testing Conditions>

Specimen: 12.7 mm (width)×6.4 mm (thickness)×64 mm (length)

Notch: Machine processing

Measurement temperature: 0° C. and −30° C.

5. Melting Point (Tm) and Glass Transition Temperature (Tg);

An endotherm curve of DSC was determined, and the temperature at the maximum peak position was defined as Tm.

The measurement was conducted and determined from an endotherm curve obtained when a sample was filled in an aluminum pan and was heated to 200° C. at a rate of 100° C./min, kept at 200° C. for 10 minutes, then cooled at a rate of 10° C./min to −150° C., and subsequently heated at a rate of 10° C./min.

6. Intrinsic Viscosity [η]

The intrinsic viscosity was measured at 135° C. in decalin.

7. Mw/Mn;

The molecular weight distribution was measured using GPC (gel permeation chromatography) in ortho-dichlorobenzene solvent at 140° C.

8. Softening Point of Component (H);

The softening point was measured by the ring and ball method (ASTM-D36).

9. Dynamic Viscoelasticity Measurement;

The dynamic viscoelasticity measurement was conducted using RDS-II manufactured by Rheometrics Inc. in a torsion mode (torsion) between a width of 10 mm and a length of 38 mm, and under the conditions of heating rate of 2° C./min, temperature of −100 to 100° C., and a frequency of 10 rad/s, to obtain values for a loss tangent (tan δ) and a storage elastic modulus G' at each temperature. A large maximum value of the tan δ indicates the excellence in vibration-damping property, vibration-preventing property, sound-insulating property, and sound-absorbing property.

Synthesis Example 1

Synthesis of Syndiotactic Polypropylene

According to the method described in Japanese Unexamined Patent Application Publication No. 2-274763, a syndiotactic polypropylene was synthesized by bulk polymerization of propylene in the presence of hydrogen, using a catalyst comprising diphenylmethylene(cyclopentadienyl)fluorenylzirconium dichloride and methylaluminoxane. The melt flow index of the obtained syndiotactic polypropylene (hereinafter, also may be referred to as "synPP") was 4.4 g/10 min, the molecular weight distribution measured by GPC was 2.3, the syndiotactic pentad fraction (rrrr) measured by $^{13}$C-NMR was 0.823, and Tm and Tg measured by differential scanning calorimetry were 127° C. and 57° C., respectively.

Example 1

Synthesis of Propylene/Butene/Ethylene Copolymer (1)

500 ml of dry hexane, 240 g of 1-butene, and 1.0 mmol of triisobutylaluminum were introduced at normal temperature into a polymerization apparatus (polymerization vessel) having a volume of 2000 ml thoroughly purged with nitrogen. Then, the temperature inside the polymerization vessel was raised to 35° C., and the polymerization vessel was pressurized with propylene to 0.6 MPa, and subsequently pressurized with supplied ethylene to 0.62 MPa. Thereafter, a toluene solution in which 0.005 mmol of diphenylmethylene(cyclopentadienyl)fluorenylzirconium dichloride and 1.5 mmol, relative to aluminum, of methylaluminoxane (manufactured by Tosoh Finechem Corp.) were contacted with each other was added to the polymerization vessel, and polymerization was conducted for 5 minutes while maintaining the internal temperature at 35° C. and the polymerization vessel pressure at 0.62 MPa by supplying ethylene. 20 ml of methanol was added to terminate the polymerization. After depressurizing, a polymer was precipitated out from the polymerization solution in 2 L of methanol, and was dried under vacuum at 130° C. for 12 hours.

39.2 g of the polymer (hereinafter, also may be referred to as "sPBER (1)") was obtained. The sPBER (1) had a composition of a propylene content of 67.9 mol %, an ethylene content of 5.1 mol %, and a 1-butene content of 27.0 mol %, and had an intrinsic viscosity [η] of 2.89 dl/g, a glass transition temperature Tg of −19.7° C., no melting point, and the molecular weight distribution measured by GPC of 2.0. In addition, the absorption intensity ratios measured by $^{13}$C-NMR as defined above were (A/C)×100=3, and (B/C)×100=81.

The sPBER (1) was subjected to molding under the conditions of heating plate temperature of 190° C., preheating for 6 minutes, and applying pressure (10 MPa) for 2 minutes, and then was cooled under pressure (10 MPa) after transferring to a press molding machine at a heating plate temperature of 20° C., thus to prepare a press sheet, and various physical properties were measured. The impact resistance strength at low temperature was measured using an injection specimen of sPBER (1). The measurement results are shown in Table 1.

Example 2

Synthesis of Propylene/Butene/Ethylene Copolymer (2)

The polymerization was conducted in the same manner as in Synthesis Example 1, except that the pressure inside the polymerization vessel was pressurized with propylene to 0.54 MPa, and subsequently pressurized with ethylene supplied to 0.62 MPa. 82.6 g of the polymer (hereinafter, also may be referred to as "sPBER (2)") was obtained. The sPBER (2) had a composition of a propylene content of 61.3 mol %, an ethylene content of 10.3 mol %, and a 1-butene content of 28.4 mol %, and had an intrinsic viscosity [η] of 2.67 dl/g, a glass transition temperature Tg of −24.7° C., no melting point, and the molecular weight distribution measured by GPC of 2.0. In addition, the absorption intensity ratios measured by $^{13}$C-NMR as defined above were (A/C)×100=3, and (B/C)×100=79.

A press sheet and an injection specimen were prepared using the sPBER (2) in the same manner as in Example 1, and various physical properties were measured. The measurement results are shown in Table 1.

Example 2-2

Synthesis of Propylene/Butene/Ethylene Copolymer (2-2)

The polymerization was conducted in the same manner as in Synthesis Example 1, except that the pressure inside the polymerization vessel was pressurized with propylene to 0.50 MPa, and subsequently pressurized with ethylene supplied to 0.62 MPa. 91.2 g of the polymer (hereinafter, also may be referred to as "sPBER (2-2)") was obtained. The sPBER (2) had a composition of a propylene content of 61.3 mol %, an ethylene content of 15.3 mol %, and a 1-butene content of 26.2 mol %, and had an intrinsic viscosity [η] of 2.89 dl/g, a glass transition temperature Tg of −31.4° C., no melting point, and the molecular weight distribution measured by GPC of 2.0. In addition, the absorption intensity ratios measured by $^{13}$C-NMR as defined above were (A/C)×100=4, and (B/C)×100=78.

A press sheet and an injection specimen were prepared using the sPBER (2-2) in the same manner as in Example 1, and various physical properties were measured. The measurement results are shown in Table 1.

Example 3

Synthesis of Propylene/Ethylene Copolymer (3)

750 ml of heptane was added at room temperature to a 1.5 liter autoclave, which had been dried under reduced pressure and purged with nitrogen, and subsequently 1.0 mmol/ml toluene solution of triisobutylaluminum (hereinafter, abbreviated as "TIBA") was added such that the total amount added was 0.3 mmol relative to aluminum atoms. 50.7 liters of propylene (25° C., 1 atmosphere) was introduced under stirring, and the system was heated to reach 30° C. Thereafter, the system was pressurized with ethylene supplied to 0.55 MPa, and 3.75 ml of a heptane solution (0.0002 mmol/ml) of diphenylmethylene(cyclopentadienyl)fluorenyl zirconium dichloride which is synthesized by a known method, and 2.0 ml of a toluene solution (0.002 mmol/ml) of (triphenylcarbenium tetra(pentafluorophenyl)borate) were added thereto to initiate copolymerization of propylene and ethylene. The catalyst concentrations at this time was 0.001 mmol/L of diphenylmethylene(cyclopentadienyl)fluorenyl zirconium dichloride and 0.004 mmol/L of triphenylcarbenium tetra(pentafluorophenyl)borate based on the whole system.

During the polymerization, the pressure inside the autoclave was maintained at 0.55 MPa by continuously supplying ethylene. After 30 minutes of polymerization initiation, the polymerization reaction was terminated by adding 20 ml of methanol. After depressurizing, the polymer solution was taken out, and this polymer solution was washed using the same volume of "an aqueous solution prepared by adding 5 ml of concentrated hydrochloric acid to 1 liter of water", to transfer the catalyst residues to the aqueous phase. This catalyst mixed solution was left to stand, and then the aqueous phase was separated and removed, which was then further washed twice with distilled water to separate the polymerization liquid into an oil phase and an aqueous phase. Subsequently, the oil-water separated polymerization liquid was contacted with 3 times the volume (volume ratio) of acetone under vigorous stirring to precipitate the polymer. Then, the precipitate was sufficiently washed with acetone, and the solid portion (copolymer) was collected through filtration. Subsequently, the solid portion was dried at 130° C. and at 350 mmHg for 12 hours under a nitrogen flow. The yield of thus obtained propylene/ethylene copolymer (hereinafter, also may be referred to as "sPER (3)") was 50.0 g. In addition, the sPER (3) had a composition of a propylene content of 76.0 mol %, and an ethylene content of 24.0 mol %, and had an intrinsic viscosity [η] measured at 135° C. in decalin of 2.4 dl/g, a glass transition temperature Tg of −28° C., no melting point, and the molecular weight distribution measured (Mw/Mn) by GPC of 2.9.

A press sheet and an injection specimen were prepared using the sPER (3) in the same manner as in Example 1, and various physical properties were measured. The measurement results are shown in Table 1.

Example 4

20 parts by weight of isotactic polypropylene (hereinafter, also may be referred to as "isoPP") (grade: E110G, MFR=0.5, melting point=165° C., mmmm=95.8%, amount of decane-soluble parts=0.3% by weight) produced by Mitsui Chemicals Inc., and 80 parts by weight of sPBER (2) obtained in Example 2 were mixed and melt kneaded at 200° C. to obtain a thermoplastic resin composition (hereinafter, also may be referred to as "Composition (4)").

A press sheet and an injection specimen were prepared using the Composition (4) in the same manner as in Example 1, and various physical properties were measured. The measurement results are shown in Table 1.

Example 5

To total 100 parts by weight of 20 parts by weight of isoPP and 80 parts by weight of sPBER (2) obtained in Example 2, 20 parts by weight of hydrogenated terpene resin P125 (softening point measured by the ring and ball method of 125° C.) produced by Yasuhara Chemical Co. Ltd. was added and melt kneaded at 200° C. to obtain a thermoplastic resin composition (hereinafter, also may be referred to as "Composition (5)").

A press sheet and an injection specimen were prepared using the Composition (5) in the same manner as in Example 1, and various physical properties were measured. The measurement results are shown in Table 1.

Example 6

20 parts by weight of synPP obtained in Synthesis Example 1 and 80 parts by weight of sPBER (2) obtained in Example 2 were melt kneaded at 200° C. to obtain a thermoplastic resin composition (hereinafter, also may be referred to as "Composition (6)").

A press sheet and an injection specimen were prepared using the Composition (6) in the same manner as in Example 1, and various physical properties were measured. The measurement results are shown in Table 1.

Example 7

To total 100 parts by weight of 20 parts by weight of synPP obtained in Synthesis Example 1 and 80 parts by weight of sPBER (2) obtained in Example 2, 20 parts by weight of hydrogenated terpene resin P125 produced by Yasuhara Chemical Co. Ltd. was added and melt kneaded at 200° C. to obtain a thermoplastic resin composition (hereinafter, also may be referred to as "Composition (7)").

A press sheet and an injection specimen were prepared using the Composition (7) in the same manner as in Example 1, and various physical properties were measured. The measurement results are shown in Table 1.

Example 8

Total 100 parts by weight of 20 parts by weight of isoPP and 80 parts by weight of sPBER (2) obtained in Example 2 was mixed with 20 parts by weight of hydrogenated terpene resin P125 produced by Yasuhara Chemical Co. Ltd. and 20 parts by weight of TAFMER A4070 (density of 0.872 g/cm$^3$, MFR=7 g/10 min) (shown as "(C)EBR" in Table 1) produced by Mitsui Chemicals Inc., and the mixture was melt kneaded at 200° C. to obtain a thermoplastic resin composition (hereinafter, also may be referred to as "Composition (8)").

A press sheet and an injection specimen were prepared using the Composition (8) in the same manner as in Example 1, and various physical properties were measured. The measurement results are shown in Table 1.

Example 9

Total 100 parts by weight of 20 parts by weight of isoPP and 80 parts by weight of sPBER (2) obtained in Example 2 was mixed with 20 parts by weight of TAFMER A4070 (density of 0.872 g/cm$^3$, MFR=7 g/10 min) produced by Mitsui Chemicals Inc., 20 parts by weight of hydrogenated terpene resin P125 produced by Yasuhara Chemical Co. Ltd., and 0.05 parts by weight of Peroxide PH25B produced by Nippon Oil & Fats Co., Ltd., and the mixture was melt kneaded at 200° C. to obtain a thermoplastic resin composition (hereinafter, also may be referred to as "Composition (9)").

A press sheet and an injection specimen were prepared using the Composition (9) in the same manner as in Example 1, and various physical properties were measured. The measurement results are shown in Table 1.

Example 10

Total 100 parts by weight of 20 parts by weight of isoPP and 80 parts by weight of sPBER (2) obtained in Example 2 was mixed with 20 parts by weight of an ethylene/vinyl acetate copolymer (EVAFLEX: P1905, density of 0.940 g/cm$^3$, MFR=2.5 g/10 min) manufactured by Dupont-Mitsui Polychemicals Co., Ltd., and 20 parts by weight of hydrogenated terpene resin P125 produced by Yasuhara Chemical Co. Ltd., and the mixture was melt kneaded at 200° C. to obtain a thermoplastic resin composition (hereinafter, also may be referred to as "Composition (10)").

A press sheet and an injection specimen were prepared using the Composition (10) in the same manner as in Example 1, and various physical properties were measured. The measurement results are shown in Table 1.

Example 11

To total 100 parts by weight of 20 parts by weight of isoPP and 80 parts by weight of sPBER (2) obtained in Example 2, 20 parts by weight of hydrogenated terpene resin P125 produced by Yasuhara Chemical Co. Ltd. and 300 parts by weight of magnesium hydroxide (shown as "(Z) inorganic filler (inorganic flame retardant)" in Table 1) produced by Ajinomoto Fine Chemical Co., Ltd. were added, and melt kneaded at 200° C. to obtain a thermoplastic resin composition (hereinafter, also may be referred to as "Composition (11)").

A press sheet and an injection specimen were prepared using the Composition (11) in the same manner as in Example 1, and various physical properties were measured. The measurement results are shown in Table 1.

Example 12

20 parts by weight of synPP obtained in Synthesis Example 1 and 80 parts by weight of sPER (3) obtained in Example 3 were melt kneaded at 200° C. to obtain a thermoplastic resin composition (hereinafter, also may be referred to as "Composition (12)").

A press sheet and an injection specimen were prepared using the Composition (12) in the same manner as in Example 1, and various physical properties were measured. The measurement results are shown in Table 1.

Example 13

Total 100 parts by weight of 20 parts by weight of isoPP and 80 parts by weight of sPBER (2) obtained in Example 2 was mixed with 20 parts by weight of TAFMER A4070 (density of 0.872 g/cm$^3$, MFR=7 g/10 min) produced by Mitsui Chemicals Inc., and the mixture was melt kneaded at 200° C. to obtain a thermoplastic resin composition (hereinafter, also may be referred to as "Composition (13)").

A press sheet and an injection specimen were prepared using the Composition (13) in the same manner as in Example 1, and various physical properties were measured. The measurement results are shown in Table 1.

Example 14

A thermoplastic resin composition (hereinafter, also may be referred to as "Composition (14)") was obtained in the same manner as in Example 13, except that sPBER (1) obtained in Example 1 was used instead of the 80 parts by weight of sPBER (2) obtained in Example 2.

A press sheet and an injection specimen were prepared using the Composition (14) in the same manner as in Example 1, and various physical properties were measured. The measurement results are shown in Table 1.

Example 15

70 parts by weight of sPBER (1) obtained in Example 1 was mixed with 30 parts by weight of TAFMER A4070 (density of 0.872 g/cm$^3$, MFR=7 g/10 min) produced by Mitsui Chemicals Inc., and the mixture was melt kneaded at 200° C. to obtain a thermoplastic resin composition (hereinafter, also may be referred to as "Composition (15)").

A press sheet and an injection specimen were prepared using the Composition (15) in the same manner as in Example 1, and various physical properties were measured. The measurement results are shown in Table 1.

Example 16

80 parts by weight of sPBER (1) obtained in Example 1 and 20 parts by weight of isoPP were kneaded using a monoaxial extruder with the preset temperature of 190° C., and a thermoplastic resin composition (hereinafter, also may be referred to as "Composition (16)") was obtained. To 100 parts by weight of the Composition (16), 3 parts by weight of zinc oxide (shown as "(f) Blowing activator" in Table 1) and 2 parts by weight of azodicarbonamide (shown as "(F) Foaming agent" in Table 1) were blended, and the mixture was kneaded using a kneader with a preset temperature of 100° C. for 10 minutes, and further kneaded using a roller having a surface temperature of 100° C. for 10 minutes, so as to be formed in a sheet form.

Thus obtained sheet was filled in a press tool, and was applied with pressure and heated under the conditions of 150 kgf/cm$^2$, 155° C., and 30 minutes, to obtain a foam product. The press metal mold had a thickness of 15 mm, length of 150 mm, and width of 200 mm.

Subsequently, the rebound resiliency of the foam was measured according to the method described above. The result is shown in Table 1.

Example 17

Total 100 parts by weight of 80 parts by weight of sPBER (1) obtained in Example 1 and 20 parts by weight of isoPP was mixed with 30 parts by weight of TAFMER A4070 (density of 0.872 g/cm$^3$, MFR=7 g/10 min) produced by Mitsui Chemicals Inc., and the mixture was kneaded using a monoaxial extruder with a preset temperature of 190° C. to obtain a thermoplastic resin composition (hereinafter, also may be referred to as "Composition (17)"). To 130 parts by weight of the Composition (17), 3.9 parts by weight of zinc oxide and 2.6 parts by weight of azodicarbonamide were blended, and the mixture was used to prepare a foam product in the same manner as in Example 16. The physical properties were measured, and the results are shown in Table 1.

Example 18

70 parts by weight of sPBER (1) obtained in Example 1 was mixed with 30 parts by weight of TAFMER A4070 (density of 0.872 g/cm$^3$, MFR=7 g/10 min) produced by Mitsui Chemicals Inc., and the mixture was kneaded using a monoaxial extruder with a preset temperature of 190° C. to obtain a thermoplastic resin composition (hereinafter, also may be referred to as "Composition (18)"). To 100 parts by weight of the Composition (18), 3 parts by weight of zinc oxide and 2 parts by weight of azodicarbonamide were blended, and the mixture was used to prepare a foam product in the same manner as in Example 16. The physical properties were measured, and the results are shown in Table 1.

Example 19

A thermoplastic resin composition (hereinafter, also may be referred to as "Composition (19)") was obtained in the same manner as in Example 8, except that sPBER (2-2) was used instead of sPBER (2) obtained in Example 2.

A press sheet and an injection specimen were prepared using the Composition (19) in the same manner as in Example 1, and various physical properties were measured. The measurement results are shown in Table 1.

Example 20

With the use of a float glass (30 cm square, 2 mm in thickness) as a substrate, a laminate (3-layered laminate) was produced by laminating a substrate, the Composition 8 (thickness before the compression press of 1.0 mm), and a substrate in the said order, and then by subjecting to a compression press (conditions: pressure: 2 kgf/cm$^2$, 160° C.×3 minutes).

A vibration absorbing test (vibration damping test) was carried out using the obtained laminate as a specimen according to the following process. The results are shown in Table 2.

A Vibration Absorbing Test (Vibration Damping Test);

All sides of the specimen were fixed to a support frame and kept horizontally at each temperature of −20° C., 20° C., and 40° C. On the center thereof, a steel ball having the mass weight of 2.26 kg was freely dropped in a vertical direction. The height, which is a start point from where the steel ball is dropped to the specimen, is controlled up and down to determine the required height, which is a start position of dropping the steel ball, for the ball to penetrate the specimen. This operation was repeated for 5 times, and their average value was obtained (hereinafter, referred to as "average penetration height"). Therefore, a larger numerical value of the average penetration height represents a greater penetration resistance of the laminate (the specimen).

Comparative Example 1

A press sheet and an injection specimen were prepared using TAFMER A4070 (density of 0.872 g/cm$^3$, MFR=7 g/10 min) produced by Mitsui Chemicals Inc. in the same manner as in Example 1, and various physical properties were measured. The measurement results are shown in Table 1.

TABLE 1

|  | Ex. 1 | Ex. 2 | Ex. 2-2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| (A) | | | | | | | | | | | |
| sPBER(1) | 100 | | | | | | | | | | |
| sPBER(2) | | 100 | | | 80 | 80 | 80 | 80 | 80 | 80 | 80 |
| sPBER(2-2) | | | 100 | | | | | | | | |
| sPBER(3) | | | | 100 | | | | | | | |
| (B) | | | | | | | | | | | |
| IsoPP | | | | | 20 | 20 | | | 20 | 20 | 20 |
| SynPP | | | | | | | 20 | 20 | | | |
| (C) | | | | | | | | | | | |
| EBR | | | | | | | | | 20 | 20 | |
| (D) | | | | | | | | | | | |
| EVA (ethylene acetate/vinyl copolymer) | | | | | | | | | | | 20 |
| (Z) | | | | | | | | | | | |
| Inorganic filler (inorganic flame retardant) | | | | | | | | | | | |
| (F) | | | | | | | | | | | |
| Foaming agent | | | | | | | | | | | |
| (f) | | | | | | | | | | | |
| Blowing activator | | | | | | | | | | | |
| (G) | | | | | | | | | | | |
| Crosslinking agent | | | | | | | | | | | 0.05 |
| (H) | | | | | | | | | | | |
| Hydrogenated terpene resin | | | | | 20 | | 20 | 20 | 20 | 20 | |
| Thermal resistance (TMA) (° C.) | 52 | 52 | 45 | 46 | 134 | 130 | 114 | 113 | 133 | 128 | 130 |
| Transparency (internal Haze) (%) | 8 | 6 | 5 | 7 | 14 | 13 | 14 | 12 | 34 | 30 | 60 |
| Maximum value of Tan δ* | 0.7 | 1.3 | 1.5 | 1.5 | 0.9 | 0.9 | 1.0 | 1.2 | 0.7 | 0.7 | 0.7 |
| Rebound resilience (%) | 17 | 17 | 27 | 42 | 16 | 8 | 13 | 6 | 12 | 15 | 15 |
| IR (IZ: 0° C.)* (J/m) | NB | NB | NB | NB | 480 | 390 | NB | 490 | NB | NB | 430 |

TABLE 1-continued

| | Ex. 11 | Ex. 12 | Ex. 13 | Ex. 14 | Ex. 15 | Ex. 16 | Ex. 17 | Ex. 18 | Ex. 19 | Comp. Ex. 1 |
|---|---|---|---|---|---|---|---|---|---|---|
| (A) | | | | | | | | | | |
| sPBER(1) | | | | 80 | 70 | 80 | 80 | 70 | | |
| sPBER(2) | 80 | | 80 | | | | | | | |
| sPBER(2-2) | | | | | | | | | 80 | |
| sPBER(3) | | 80 | | | | | | | | |
| (B) | | | | | | | | | | |
| IsoPP | 20 | | 20 | 20 | | 20 | 20 | | 20 | |
| SynPP | | 20 | | | | | | | | |
| (C) | | | | | | | | | | |
| EBR | | | 20 | 20 | 30 | | 30 | 30 | 20 | 100 |
| (D) | | | | | | | | | | |
| EVA (ethylene acetate/vinyl copolymer) (Z) | | | | | | | | | | |
| Inorganic filler (inorganic flame retardant) (F) | 300 | | | | | | | | | |
| Foaming agent (f) | | | | | | 2.0 | 2.6 | 2.0 | | |
| Blowing activator (G) | | | | | | 3.0 | 3.9 | 3.0 | | |
| Crosslinking agent (H) | | | | | | | | | | |
| Hydrogenated terpene resin | 20 | 20 | | | | | | | 20 | |
| Thermal resistance (TMA) (° C.) | 140 | 105 | 135 | 134 | 70 | | | | 105 | 45 |
| Transparency (internal Haze) (%) | 98 | 12 | 37 | 41 | 44 | | | | 36 | 9 |
| Maximum value of Tan δ* | 0.5 | 0.8 | 0.6 | 0.6 | 1.2 | | | | 0.7 | 0.5 |
| Rebound resilience (%) | 17 | 40 | 20 | 21 | 27 | 31 | 37 | 35 | 29 | 78 |
| IR (IZ: 0° C.)* (J/m) | 290 | NB | NB | NB | NB | | | | NB | NB |

IR (IZ: 0° C.)*: Impact resistance strength at low temperature (IZ: 0° C.)

TABLE 2

| | Temperature (° C.) | | |
|---|---|---|---|
| | −20 | 20 | 40 |
| average penetration height (m) | 6.5 | 7.9 | 5.4 |

Industrial Applicability

The material for vibration control of the invention can be favorably used in the field of optics/information/electronic parts, automobile interior or exterior materials, building materials and household appliance, materials for laminating steel plates, shoes, and the like.

The invention claimed is
1. A material for vibration control comprising:
a composition (X) comprising:
99 to 40 parts by weight of a propylene polymer (A) which is a propylene/ethylene/α-olefin having 4 to 20 carbon atoms copolymer having 1 to 25 mol % of a constitutional unit derived from ethylene and 1 to 35 mol % of a constitutional unit derived from α-olefin having 4 to 20 carbon atoms, while the total constitutional unit contained in the propylene polymer (A) is 100 mol %, and has a melting point measured by DSC of 90° C. or below or has no observed melting point, and wherein the propylene polymer (A), for which an absorption intensity A observed at 22.0 to 20.9 ppm, an absorption intensity B observed at 19.0 to 20.6 ppm, and an absorption intensity C observed at 19.0 to 22.0 ppm assigned to propylene methyl, in the signal chart where a peak at the highest magnetic field among the signals originating from CH (methine) constitutional units derived from α-olefin having 4 to 20 carbon atoms measured by $^{13}$C-NMR in an o-dichlorobenzene solvent is defined as 34.4 ppm, are satisfying the following relational expressions (i) and (ii):

$(A/C) \times 100 \leq 8$ (i), and $(B/C) \times 100 \geq 60$ (ii), 1 to 60 parts by weight of a propylene polymer (B) which has a melting point measured by DSC of 100° C. or above, while the total of (A) and (B) is 100 parts by weight, and 5 to 50 parts by weight of a hydrogenated terpene resin, to 100 parts by weight in total of the propylene polymer (A) and the propylene polymer (B).

2. The material for vibration control according to claim 1, wherein the propylene polymer (A) is obtained by polymerizing monomers containing propylene in the presence of a catalyst including a transition metal compound represented by the following general formula (1):

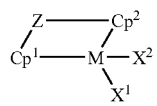

(1)

wherein, M is Ti, Zr, Hf, Nd, Sm, or Ru, $Cp^1$ and $Cp^2$ are each pi-bonded with M and are each a cyclopentadienyl group, an indenyl group, a fluorenyl group, or derivatives thereof, $Cp^1$ and $Cp^2$ are each a group different from each other, $X^1$ and $X^2$ are each an anionic ligand or a neutral Lewis base ligand, and Z is an atom selected from C, O, B, S, Ge, Si and Sn, or a group containing the atom.

3. The material for vibration control according to claim 1, wherein the composition (X) further comprises 1 to 500 parts by weight of an ethylene/α-olefin copolymer (C), to 100 parts by weight in total of the propylene polymer (A) and the propylene polymer (B).

4. The material for vibration control according to claim 1, wherein the composition (X) further comprises 1 to 500 parts by weight of an ethylene/polar monomer copolymer (D), to 100 parts by weight in total of the propylene polymer (A) and the propylene polymer (B).

5. The material for vibration control according to claim 1, wherein the composition (X) further comprises an inorganic filler (Z), and optionally an ethylene/α-olefin copolymer (C) and optionally an ethylene/polar monomer copolymer (D), and the amount of the inorganic filler (Z) is 1 to 1000 parts by weight to 100 parts by weight in total of the propylene polymer (A), the propylene polymer (B), the ethylene/α-olefin copolymer (C), and the ethylene/polar monomer copolymer (D).

6. The material for vibration control according to claim 1, wherein the composition (X) further comprises optionally an ethylene/α-olefin copolymer (C) and optionally an ethylene/polar monomer copolymer (D) and wherein any one or two or more of the propylene polymer (A), the propylene polymer (B), the ethylene/α-olefin copolymer (C), and the ethylene/polar monomer copolymer (D) is partially or entirely graft modified with at least one selected from a silane compound, a titanium compound, unsaturated carboxylic acid, and anhydrides thereof.

7. The material for vibration control according to claim 1, wherein the composition (X) further comprises a foaming agent (F).

8. The material for vibration control according to claim 7, wherein the composition (X) further comprises optionally an ethylene/α-olefin copolymer (C) and optionally an ethylene/polar monomer copolymer (D), and the amount of the foaming agent (F) is 0.0001 to 10 parts by weight to 100 parts by weight in total of the propylene polymer (A), the propylene polymer (B), the ethylene/α-olefin copolymer (C), and the ethylene/polar monomer copolymer (D).

9. The material for vibration control according to claim 1, wherein the composition (X) further comprises a crosslinking agent (G), and optionally an ethylene/α-olefin copolymer (C) and optionally an ethylene/polar monomer copolymer (D), and the amount of the crosslinking agent (G) is 0.001 to 10 parts by weight to 100 parts by weight in total of the propylene polymer (A), the propylene polymer (B), the ethylene/α-olefin copolymer (C), and the ethylene/polar monomer copolymer (D).

10. An article for vibration control obtained from the material of claim 1.

11. An article for vibration control comprising the material of claim 1.

12. The article for vibration control according to claim 10, which is a foam product.

13. The article for vibration control according to claim 11, which is a foam product.

* * * * *